US012608827B2

(12) United States Patent　　(10) Patent No.:　US 12,608,827 B2
Dudrenov et al.　　　　　　　　(45) Date of Patent:　　Apr. 21, 2026

(54) ADJUSTING DISPLAY OF AN IMAGE BASED ON DEVICE POSITION

(71) Applicant: Apple Inc., Cupertino, CA (US)

(72) Inventors: Pavel V. Dudrenov, San Francisco, CA (US); Felipe Bacim de Araujo e Silva, San Jose, CA (US); Karol E. Czaradzki, Mountain View, CA (US); Zachary D. Corley, Sunnyvale, CA (US); Edwin Iskandar, San Jose, CA (US); Seung Wook Kim, San Jose, CA (US)

(73) Assignee: APPLE INC., Cupertino, CA (US)

( * ) Notice: Subject to any disclaimer, the term of this patent is extended or adjusted under 35 U.S.C. 154(b) by 661 days.

(21) Appl. No.: 17/988,477

(22) Filed: Nov. 16, 2022

(65) Prior Publication Data

US 2023/0334676 A1　　Oct. 19, 2023

Related U.S. Application Data

(63) Continuation of application No. 17/877,255, filed on Jul. 29, 2022, now abandoned.

(Continued)

(51) Int. Cl.
　　*G06T 7/30*　　　　(2017.01)
　　*G06T 3/40*　　　　(2006.01)
　　(Continued)

(52) U.S. Cl.
　　CPC .................. *G06T 7/30* (2017.01); *G06T 3/40* (2013.01); *G06T 3/60* (2013.01); *G06T 7/60* (2013.01);
　　(Continued)

(58) Field of Classification Search
　　CPC .... G06T 7/30; G06T 7/60; G06T 7/70; G06T 3/40; G06T 3/60; G06T 2207/30201;
　　(Continued)

(56) References Cited

U.S. PATENT DOCUMENTS

2014/0285404 A1　　9/2014　Takano et al.
2015/0073914 A1*　3/2015　Tsou .................. G06Q 30/0269
　　　　　　　　　　　　　　　　　　　　　　705/14.66

(Continued)

FOREIGN PATENT DOCUMENTS

CA　　　3044063 A1 *　6/2018　......... G06V 40/1394
CN　　105611153 A *　5/2016　............. H04N 23/69
　　　　　　(Continued)

OTHER PUBLICATIONS

Office Action for corresponding Chinese Appl. No. 2022111054086 dated Feb. 11, 2025 (6 pages).

(Continued)

*Primary Examiner* — Carol W Chan
(74) *Attorney, Agent, or Firm* — Fernando & Partners, LLP

(57)　　　　　　ABSTRACT

Various implementations disclosed herein include devices, systems, and methods for adjusting display of an image based on device position. In some implementations, a device includes an image sensor, a display, a non-transitory memory and one or more processors coupled with the image sensor, the display and the non-transitory memory. In some implementations, a method includes obtaining a first image of a body part of a user of the device. In some implementations, the method includes capturing, via the image sensor, a second image of the body part. In some implementations, the method includes determining, based on the second image, a position of the body part relative to the device. In some implementations, the method includes generating an (Continued)

adjusted image by adjusting the first image based on the position of the body part relative to the device. In some implementations, the method includes displaying the adjusted image on the display.

20 Claims, 4 Drawing Sheets

Related U.S. Application Data

(60) Provisional application No. 63/242,179, filed on Sep. 9, 2021.

(51) Int. Cl.
| | |
|---|---|
| *G06T 3/60* | (2006.01) |
| *G06T 7/60* | (2017.01) |
| *G06T 7/70* | (2017.01) |

(52) U.S. Cl.
CPC ...... *G06T 7/70* (2017.01); *G06T 2207/30201* (2013.01)

(58) Field of Classification Search
CPC ......... G06F 3/011; G06F 3/147; G06V 40/18; G09G 2340/0485; G09G 2354/00; G09G 2370/02; G09G 5/38
See application file for complete search history.

(56) References Cited

U.S. PATENT DOCUMENTS

| | | | |
|---|---|---|---|
| 2018/0101989 A1* | 4/2018 | Frueh | ..................... G06T 19/20 |
| 2019/0005679 A1 | 1/2019 | Nie | |
| 2021/0350564 A1* | 11/2021 | Peuhkurinen | .......... G06T 7/593 |

FOREIGN PATENT DOCUMENTS

| | | |
|---|---|---|
| CN | 106663400 A | 5/2017 |
| CN | 107608513 A | 1/2018 |
| CN | 111385514 A | 7/2020 |
| CN | 111665950 A | 9/2020 |

OTHER PUBLICATIONS

Office Action for corresponding Indian Application No. 202214050597 dated Aug. 29, 2025 (Translated).

* cited by examiner

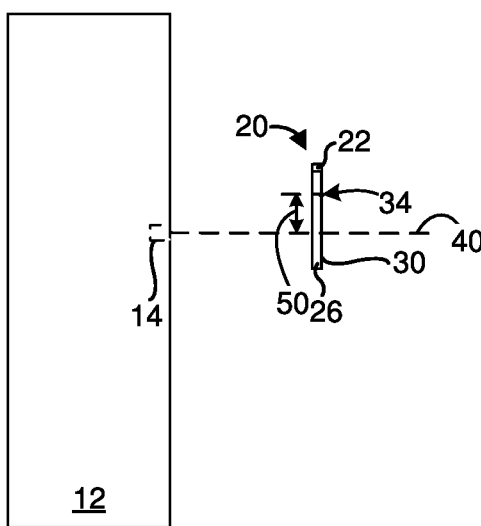
Figure 1A
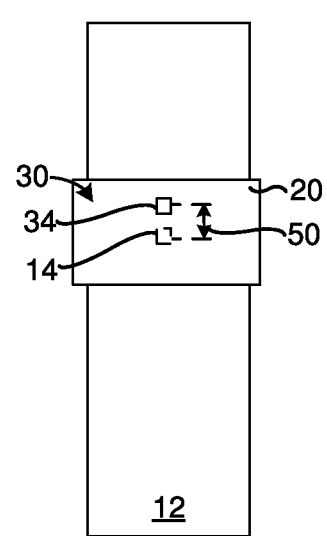
Figure 1B
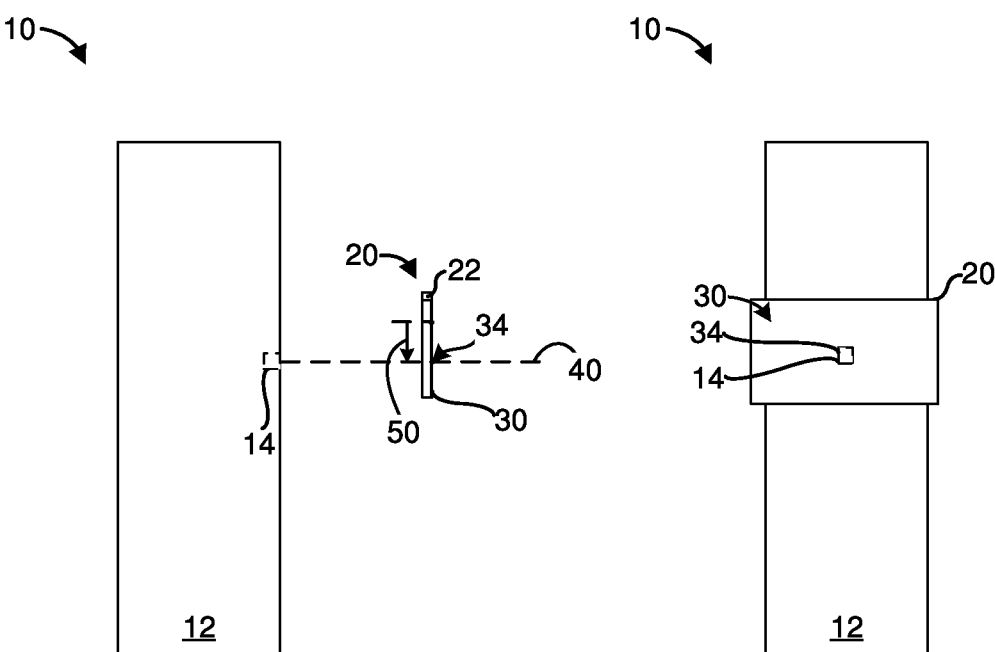
Figure 1C                    Figure 1D

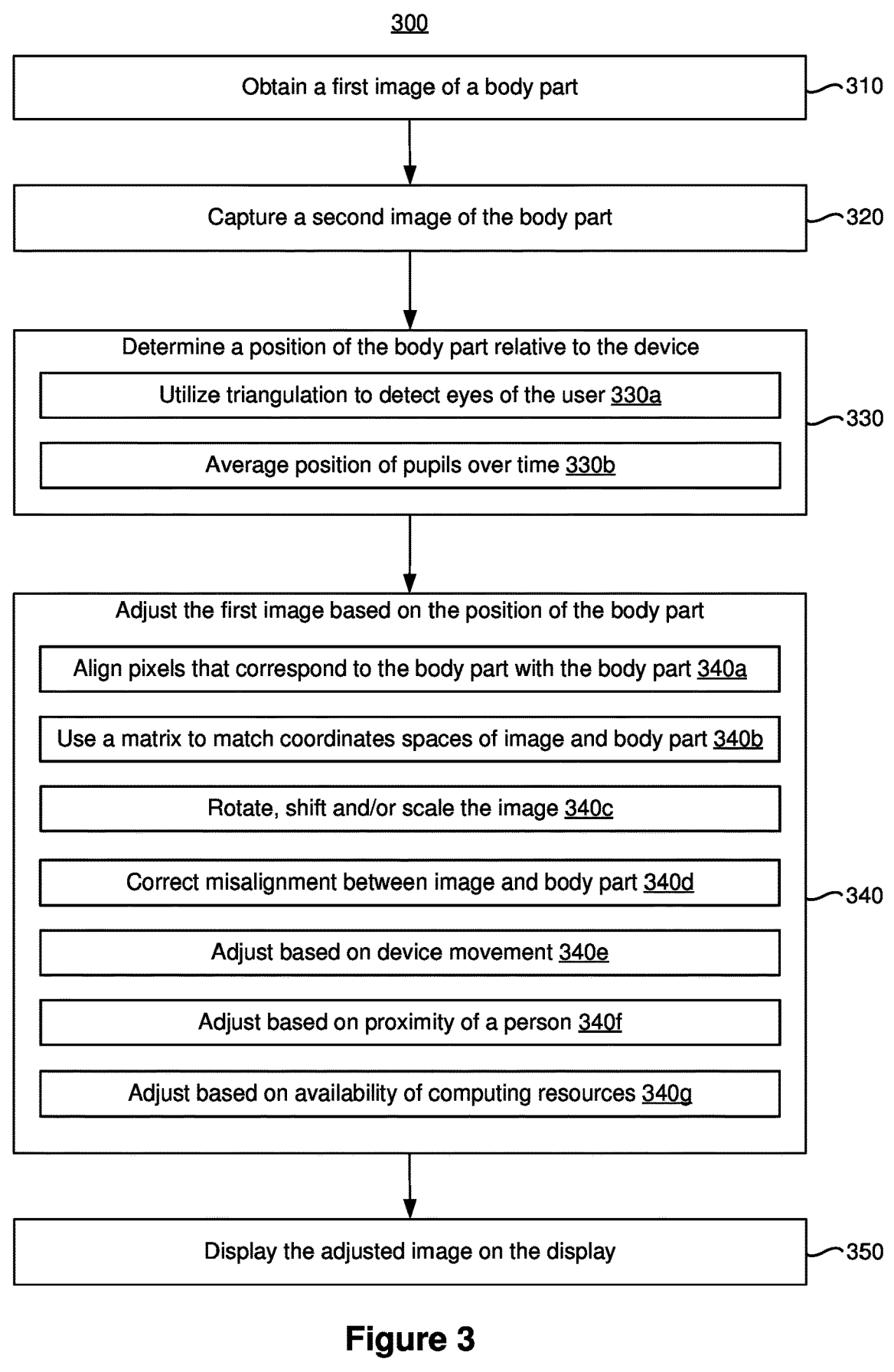

300

| Obtain a first image of a body part | ⟋310 |

↓

| Capture a second image of the body part | ⟋320 |

↓

Determine a position of the body part relative to the device

| Utilize triangulation to detect eyes of the user 330a |

| Average position of pupils over time 330b |

⟋330

↓

Adjust the first image based on the position of the body part

| Align pixels that correspond to the body part with the body part 340a |

| Use a matrix to match coordinates spaces of image and body part 340b |

| Rotate, shift and/or scale the image 340c |

| Correct misalignment between image and body part 340d |

| Adjust based on device movement 340e |

| Adjust based on proximity of a person 340f |

| Adjust based on availability of computing resources 340g |

⟋340

↓

| Display the adjusted image on the display | ⟋350 |

Figure 3

ADJUSTING DISPLAY OF AN IMAGE BASED ON DEVICE POSITION

CROSS-REFERENCE TO RELATED APPLICATION

This application is a continuation application of and claims priority to U.S. patent application Ser. No. 17/877,255, filed on Jul. 29, 2022, which claims priority to U.S. provisional patent application No. 63/242,179, filed on Sep. 9, 2021, which are hereby incorporated by reference in their entirety.

TECHNICAL FIELD

The present disclosure generally relates to adjusting display of an image based on device position.

BACKGROUND

Some devices include an image sensor that captures images and a display that displays the captured images. These images may depict various objects or people. These images may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1A is a side view of a user and an electronic device in an operating environment in accordance with some implementations.

FIG. 1B is a front view of the user and the electronic device in accordance with some implementations.

FIG. 1C is another side view of the user and the electronic device in accordance with some implementations.

FIG. 1D is another front view of the user and the electronic device in accordance with some implementations.

FIG. 3 is a flowchart representation of a method of adjusting display of an image based on device position in accordance with some implementations.

Figure 2:
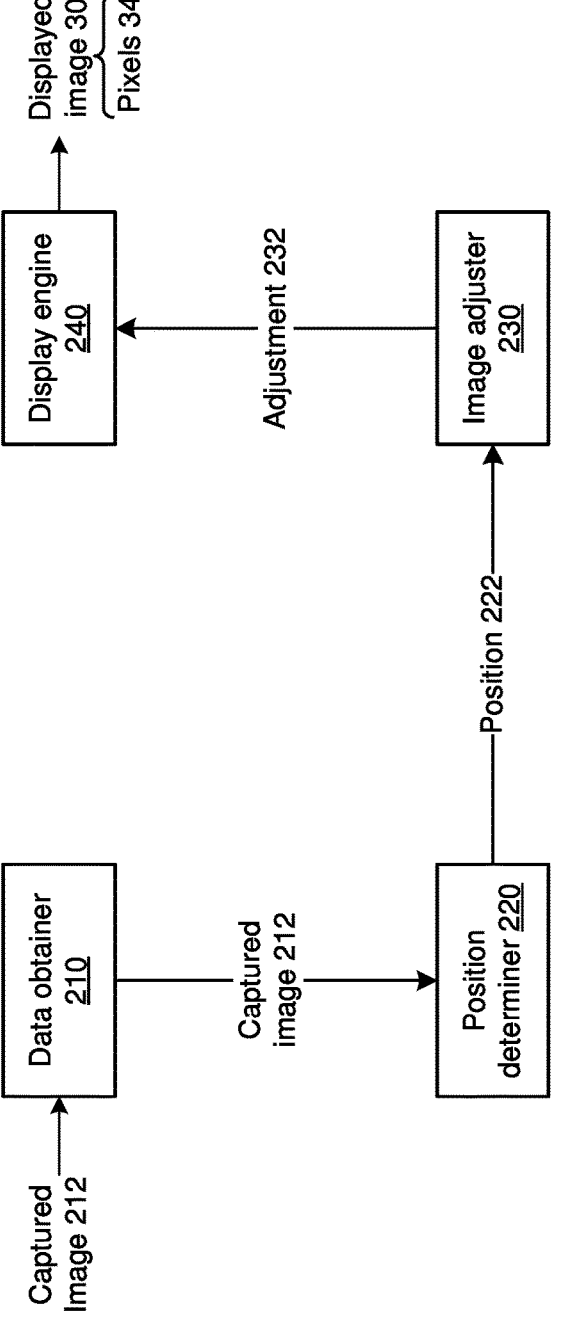
FIG. 2 is a block diagram of an image presentation engine in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for adjusting display of an image based on device position. In some implementations, a device includes an image sensor, a display, a non-transitory memory and one or more processors coupled with the image sensor, the display and the non-transitory memory. In some implementations, a method includes obtaining a first image of a body part of a user of the device. In some implementations, the method includes capturing, via the image sensor, a second image of the body part. In some implementations, the method includes determining, based on the second image, a position of the body part relative to the device. In some implementations, the method includes generating an adjusted image by adjusting the first image based on the position of the body part relative to the device. In some implementations, the method includes displaying the adjusted image on the display.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

A device may include a display that displays an image of a body part of a user of the device. Displaying the image of the body part allows another person that is located in a physical environment of the device to view a representation of the body part when the body part is obscured by the device. For example, if the device obscures the user's hand, the display displays an image of the user's hand so that another person located in a physical environment of the device can view the image of the user's hand that is obscured by the device. Displaying the image of the body part provides an appearance that a person in the physical environment is viewing the body part directly. For example, displaying an image of the user's hand provides an appearance that the user or a person interacting with the user is looking directly at the user's hand. However, a misalignment between the image of the body part and the body part detracts from the appearance. For example, if the display is displaying the user's hand in the center of the display and the user is holding the device in a manner such that a left portion of the device is obscuring the hand, the position of the pixels corresponding to the user's hand may not match where the hand is expected to be. Hence, the device may need to adjust the display of the image based on a position of the device relative to the body part. For example, the device may need to shift the image of the hand towards the left if the left portion of the device is obscuring the hand.

The present disclosure provides methods, systems, and/or devices for adjusting the display of an image of a body part on a display based on a position of the body part relative to the device. When the device displays an image of a body part on a display, the device detects whether the body part is aligned with the image of the body part. If the body part and the image of the body part are misaligned, the device shifts the image in order to align the image with the body part. As an example, if the display of the device is displaying an image of the user's hand, the device shifts the image of the user's hand in order to align the pixels representing the hand with the hand of the user. For example, if the user is holding the device more to the right than expected, the device can shift the image left in order to align the image of the hand with the hand of the user. As another example, if the user is holding the device more to the left than expected, the device can shift the image right in order to align the image of the hand with the hand of the user. Shifting the image of the hand based on a position of the device results in the image of the hand being positioned at an expected position on the display in order to provide an appearance that the user or a person in the physical environment is looking directly at the user's hand.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20 and a user 12 of the electronic device 20. FIG. 1A illustrates a side view of the user 12 and the electronic device 20. In some implementations, the electronic device 20 includes a handheld computing device that can be held by the user 12. For example, in some implementations, the electronic device 20 includes a smartphone, a tablet, a media player, a laptop, or the like. In some implementations, the electronic device 20 includes a wearable computing device that can be worn by the user 12. For example, in some implementations, the electronic device 20 includes a head-mountable device (HMD) or an electronic watch.

In the example of FIG. 1A, the electronic device 20 is positioned adjacent to the user 12 so as to occlude a body part 14 of the user 12. In some implementations, the body part 14 is a hand of the user 12 and the electronic device 20 is a tablet or a smartphone that the user 12 holds near the hand in order to capture images of the hand. In some implementations, the electronic device 20 includes a wearable computing device that the user 12 wears around the body part 14. For example, the body part 14 may be a wrist of the user 12 and the electronic device 20 may include a watch that the user 12 wears around the wrist. As another example, the body part 14 may include eyes of the user 12 and the electronic device 20 may include an HMD that the user 12 wears around a head of the user 12 thereby covering the eyes of the user 12. As such, a person located in the physical environment 10 and interacting with the user 12 may not be able to directly view the body part 14 (e.g., the hand, the wrist, or the eyes) of the user 12 because the electronic device 20 blocks a line of sight between the body part 14 and the eyes of the person viewing the body part 14.

In some implementations, the electronic device 20 includes an image sensor 22 and a display 26. In some implementations, the image sensor 22 faces a first direction and the display 26 faces a second direction that is opposite from the first direction. For example, in some implementations, the image sensor 22 is a camera that captures an image of the body part 14, and the display 26 is a display that displays an image 30 of the body part 14 ("image 30", hereinafter for the sake of brevity) toward a person viewing the user 12. In some implementations, the image 30 includes an image that is captured by the image sensor 22. Alternatively, in some implementations, the image 30 includes an image that was captured during an enrollment phase.

As shown in FIG. 1A, the image 30 includes a set of one or more pixels 34 ("pixels 34", hereinafter for the sake of brevity) that correspond to the body part 14. For example, if the body part 14 is the fingers of the user 12, the pixels 34 represent fingers of the user 12. As can be seen in FIG. 1A, the pixels 34 corresponding to the body part 14 do not intersect with a horizontal axis 40 that intersects the body part 14. In other words, the pixels 34 corresponding to the body part 14 are not aligned with the body part 14. Specifically, the pixels 34 are a distance 50 away from the horizontal axis 40. In the example of FIG. 1A, the pixels 34 do not intersect with the horizontal axis 40 because the user 12 may have positioned the electronic device 20 the distance 50 away from an expected position for the electronic device 20. For example, the user 12 may have positioned the electronic device 20 different from an expected position on his/her hand.

While FIG. 1A shows a side view of the user 12 holding or wearing the electronic device 20, FIG. 1B shows a front view of the user 12 holding or wearing the electronic device 20. As can be seen in FIG. 1B, the pixels 34 corresponding to the body part 14 are separated by the distance 50 from a projection of the body part 14 onto a plane formed by the display 26. As illustrated in FIG. 1B, the pixels 34 corresponding to the body part 14 do not align with the body part 14. If the body part 14 includes fingers of the user 12 and the pixels 34 represent the fingers displayed on the display 26, the pixels 34 may not align with the fingers because the user 12 may have positioned the electronic device 20 at a position that is different than an expected position.

As illustrated in FIGS. 1C and 1D, the electronic device 20 adjusts the display of the image 30 based on a position of the electronic device 20 relative to the body part 14. In various implementations, the electronic device 20 adjusts the display of the image 30 in order to align the pixels 34 with the body part 14. In the example of FIGS. 1C and 1D, the electronic device 20 shifts the image 30 downwards by the distance 50 so that the pixels 34 intersect with the horizontal axis 40 that goes through the body part 14. In other words, the electronic device 20 shifts the image 30 so that the pixels coincide with a projection of the body part 14 onto the plane formed by the display 26. As can be seen in FIG. 1D, the pixels 34 are aligned with the body part 14. For example, if the body part 14 is the hand and the pixels 34 represent a picture of the hand, the picture of the hand is aligned with the hand. As such, the picture of the hand is displayed at a position on the display 26 that coincides with the projection of the hand. In other words, the picture of the hand is displayed at a position on the display 26 where the hand is expected to be.

FIG. 2 illustrates a block diagram of an example image presentation engine 200. In some implementations, the image presentation engine 200 resides at the electronic device 20 shown in FIGS. 1A-1D. In various implementations, the image presentation engine 200 includes a data obtainer 210, a position determiner 220, an image adjuster 230 and a display engine 240. In various implementations, the data obtainer 210 obtains an image 212 that is captured by an image sensor ("captured image 212", hereinafter for the sake of brevity). For example, the data obtainer 210 receives the captured image 212 from the image sensor 22 shown in FIGS. 1A and 1C. In some implementations, the captured image 212 depicts the body part 14 of the user 12 shown in FIGS. 1A-1D. For example, the captured image 212 includes the pixels 34 that correspond to the body part 14 of the user 12. The data obtainer 210 provides the captured image 212 to the position determiner 220.

In various implementations, the position determiner 220 utilizes the captured image 212 to determine a position 222 of the electronic device 20 relative to the body part 14 depicted in the captured image 212. For example, in some implementations, the position determiner 220 utilizes the captured image 212 to determine a position of the electronic device 20 relative to a hand of the user 12, fingers of the user 12, an arm of the user 12, a leg of the user 12, a torso of the user 12 or eyes of the user 12. In some implementations, the position 222 indicates whether or not the electronic device 20 is positioned at an expected position relative to the user 12. For example, in some implementations, the position 222 indicates whether the user 12 is holding the electronic device 20 at an expected position relative to the body part 14. As another example, the position 222 indicates whether the user 12 is wearing the electronic device 20 higher or lower than an expected position on his/her wrist. In some implementations, the position 222 includes an offset value that indicates a distance between a current position of the electronic device 20 and an expected position of the electronic device 20 (e.g., the distance 50 shown in FIGS. 1A-1C).

In some implementations, the image adjuster 230 determines an adjustment 232 for the image 30 based on the position 222 of the electronic device 20 relative to the body part 14. In some implementations, the adjustment 232 is to shift the image 30 so that the pixels 34 corresponding to the body part 14 align with the position 222 of the body part 14. For example, as discussed in relation to FIGS. 1A-1D, in some implementations, the adjustment 232 is to shift the image 30 downwards in order to align the pixels 34 with the body part 14. While FIGS. 1C and 1D provide an example of the adjustment 232 in one dimension (e.g., a vertical adjustment, for example, the downward shift), in some implementations, the adjustment 232 includes a two-dimensional adjustment. For example, in some implementations, the adjustment 232 includes a combination of a vertical shift and a horizontal shift.

In some implementations, the adjustment 232 includes a depth adjustment where a depth of the image 30 is varied based on a distance between the body part 14 and the electronic device 20. For example, if the user 12 is further away from the electronic device 20, the adjustment 232 may include displaying the image 30 at a greater depth so that the image 30 appears farther away from a person viewing the display 26.

In some implementations, the adjustment 232 includes a rotation about the horizontal axis 40 shown in FIGS. 1A and 1C. For example, if the user 12 is holding the electronic device 20 in such a manner that the electronic device 20 is tilted towards an index finger of the user 12, the adjustment 232 may include a rotation of the image 30 in order to align the pixels 34 corresponding to the fingers with the fingers of the user 12. As another example, if the electronic device 20 is tilted towards a left eye of the user 12, the adjustment 232 includes a rotation of the image 30 in order to align the pixels 34 corresponds to the eyes with the eyes of the user 12.

In some implementations, the display engine 240 obtains an indication of the adjustment 232 from the image adjuster 230, and the display engine 240 performs the adjustment 232 on the image 30. In some implementations, the adjustment 232 is to perform a translational operation (e.g., a shifting operation), and the display engine 240 translates (e.g., shifts) the image 30. In some implementations, the adjustment 232 is to perform a rotational operation, and the display engine 240 rotates the image 30. In some implementations, the adjustment 232 is to perform a scaling operation, and the display engine 240 scales a portion of the image 30.

FIG. 3 is a flowchart representation of a method 300 for adjusting display of an image based on a position of an electronic device relative to a body part. In various implementations, the method 300 is performed by a device (e.g., the electronic device 20 shown in FIGS. 1A-1D). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining a first image of a body part of a user of the device. In some implementations, the method 300 includes retrieving the first image from a datastore (e.g., a local non-transitory memory or a remote datastore). For example, as shown in FIG. 1A, the electronic device 20 obtains the image 30 depicting the body part 14. In some implementations, the device occludes the body part from the user or a person in a physical environment of the device. For example, the device may block a line of sight between the body part and eyes of the user or eyes of the person in the physical environment of the device. As shown in FIGS. 1A-1D, the electronic device 20 hides the body part 14 from view.

As represented by block 320, in some implementations, the method 300 includes capturing, via the image sensor, a second image of the body part. For example, as discussed in relation to FIGS. 1A, 1B and 2, the image sensor 22 captures the image 212 of the body part 14. As an example, a camera of the device can capture an image of the user's hand, fingers, arm, leg, torso, face or eyes.

As represented by block 330, in some implementations, the method 300 includes determining, based on the second image, a position of the body part relative to the device. For example, as shown in FIG. 2, the position determiner 220 determines the position 222 of the electronic device 20 relative to the body part 14 based on the captured image 212. As discussed in relation to FIG. 2, in some implementations, the position 222 indicates a position of the electronic device 20 relative to the hand, the fingers, the arm, the leg, the torso, the face or the eyes of the user 12.

In some implementations, the method 300 includes determining a distance between a current position of the device and an expected position of the device. For example, as shown in FIG. 1A, the electronic device 20 determines the distance 50 between a first display location where the pixels 34 are displayed and a second display location where the horizontal axis 40 intersects the display 26. In some implementations, the method 300 includes determining a distance between a projection of the body part 14 onto a plane formed by display 26 and the pixels 34 corresponding to the body part 14.

In some implementations, the method 300 includes determining whether the body part is aligned with pixels in the first image that corresponds to the body part. For example, with reference to FIG. 1A, the electronic device 20 determines whether the pixels 34 corresponding to the body part 14 are aligned with the body part 14. In some implementations, determining whether the pixels 34 align with the body part 14 includes determining whether the pixels 34 lie on the horizontal axis 40 that goes through the body part 14. In some implementations, determining whether the pixels 34 align with the body part 14 includes determining whether the pixels 34 coincide with the projection of the body part 14 onto the plane formed by the display 26.

In some implementations, the method 300 includes utilizing stereo photogrammetry to determine the position of the body part relative to the device. In some implementations, the method 300 includes utilizing depth sensing to determine the position of the body part relative to the device. As represented by block 330a, in some implementations, the body part includes eyes of the user, and determining the position of the body part includes utilizing triangulation to detect the eyes of the user in the second image. In some implementations, the body part includes pupils of the user, and the electronic device utilizes triangulation to detect respective locations of the pupils of the user.

As represented by 330b, in some implementations, the method 300 includes determining respective positions of the body part over a period of time and averaging the respective positions of the body part over the period of time in order to reduce noise associated with detecting the position. As an example, the body part may include eyes of the user, and determining the position of the body part includes determining respective positions of pupils over a period of time and averaging the respective positions of the pupils over the period of time. Averaging the position of the pupils over a period of time tends to reduce noise associated with detecting pupil positions.

As represented by block 340, in some implementations, the method 300 includes generating an adjusted image by adjusting the first image based on the position of the body part relative to the device. For example, as shown in FIG. 1C, the electronic device 20 shifts the image 30 downwards by the distance 50 in order to align the pixels 34 with the body part 14. As another example, as described in relation to FIG. 2, the image adjuster 230 determines the adjustment 232 based on the position 222, and the display engine 240 performs the adjustment 232 to the image 30.

As represented by block 340a, in some implementations, adjusting the first image includes aligning pixels in the first image that correspond to the body part with the body part. For example, as shown in FIG. 1C, the electronic device 20 shifts the image 30 in order to align the pixels 34 depicting the body part 14 with the body part 14. In some implementations, aligning the pixels in the first image with the body part includes shifting the first image so that the pixels lie on an axis that goes through the body part.

As represented by block 340b, in some implementations, adjusting the first image includes utilizing a matrix to match a first coordinate space corresponding to the first image with a second coordinate space corresponding to the body part. In some implementations, the method 300 includes generating the matrix by identifying a geometry of the body part and encoding the geometry of the body part as coefficients of the matrix.

As represented by block 340c, in some implementations, adjusting the first image comprises rotating the first image. In some implementations, if the electronic device 20 is positioned at an angle with respect to a horizontal axis that passes through the eyes of the user 12, the electronic device 20 rotates the image of the eyes that is displayed on the display in order to align the image of the eyes with the eyes.

In some implementations, the method 300 includes determining that the device does not form a right angle with a vertical axis that passes through a nose of the user 12, and rotating the image of the eyes that is displayed on the display in order to align the image of the eyes with the eyes. In some implementations, the method 300 includes utilizing a rotation matrix to perform the rotation operation on the first image. For example, the device adjusts the first image by multiplying the first image with the rotation matrix.

In some implementations, adjusting the first image includes shifting the first image. In some implementations, shifting the first image includes shifting the first image horizontally. In some implementations, shifting the first image includes shifting the first image vertically. For example, as shown in FIG. 1C, the electronic device 20 shifts the image 30 vertically by the distance 50. In some implementations, the shifting the first image includes performing a combination of a horizontal shift and a vertical shift.

In some implementations, adjusting the first image includes scaling the first image. In some implementations, the device scales the first image by applying a scaling factor that is a function of a difference between an expected position of the device relative to the body part and a current position of the device relative to the body part.

As represented by block 340*d*, in some implementations, adjusting the first image includes detecting a misalignment between the body part and the first image of the body part, and adjusting the first image in response to the misalignment being greater than a tolerance threshold. In some implementations, the method 300 includes forgoing the adjustment in response to the misalignment being less than the tolerance threshold. For example, as shown in FIGS. 1A-1D, the electronic device 20 detects the misalignment between the pixels 34 and the body part 14, and the electronic device 20 adjusts the display of the image 30 in order to align the pixels 34 with the body part 14.

As represented by block 340*e*, in some implementations, adjusting the first image includes determining whether or not the device is being moved relative to the body part, adjusting the first image in response to determining that the device is not being moved relative to the body part, and forgoing adjustment of the first image in response to determining that the device is being moved relative to the body part. For example, the device forgoes the adjustment to the image being displayed on the display while the user is positioning the device. Since performing the adjustment utilizes computing resources and consumes battery power, forgoing the adjustment when the adjustment is not needed conserves limited computing resources and extends a battery life of the device.

As represented by block 340*f*, in some implementations, adjusting the first image includes determining whether or not a person is within a threshold distance of the device, adjusting the first image in response to determining that there is a person within the threshold distance of the device, and forgoing adjustment of the first image in response to determining that a person is not within the threshold distance of the device. The device forgoes adjusting the image when there is no person within a reasonable viewing distance of the display. Forgoing adjustment of the image when nobody is expected to view the image conserves battery power thereby extending a battery life of the device.

As represented by block 340*g*, in some implementations, adjusting the first image includes determining a battery level of the device, adjusting the first image in response to the battery level satisfying a threshold battery level, and forgoing adjustment of the first image in response to the battery level breaching the threshold battery level. The device forgoes adjusting the image when the battery level is lower than the threshold battery level. Forgoing adjustment of the image when the battery level is lower than the threshold battery level prolongs a battery life of the device by reducing battery consumption.

As represented by block 350, in various implementations, the method 300 includes displaying the adjusted image on the display. For example, as shown in FIGS. 1C and 1D, the electronic device 20 displays an adjusted version of the image 30.

Referring back to FIGS. 1A-1D, in some implementations, the electronic device 20 includes or is attached to a head-mountable device (HMD) worn by the user 12. The HMD presents (e.g., displays) an XR environment according to various implementations. In some implementations, the HMD includes an integrated display (e.g., a built-in display) that displays the XR environment. In some implementations, the HMD includes a head-mountable enclosure. In various implementations, the head-mountable enclosure includes an attachment region to which another device with a display can be attached. For example, in some implementations, the electronic device 20 can be attached to the head-mountable enclosure. In various implementations, the head-mountable enclosure is shaped to form a receptacle for receiving another device that includes a display (e.g., the electronic device 20). For example, in some implementations, the electronic device 20 slides/snaps into or otherwise attaches to the head-mountable enclosure. In some implementations, the display of the device attached to the head-mountable enclosure presents (e.g., displays) the XR environment. In various implementations, examples of the electronic device 20 include smartphones, tablets, media players, laptops, etc.

In some implementations, if the device obscures the user's eyes, the display displays an image of the user's eyes so that another person located in a physical environment of the device can view the image of the user's eyes that are obscured by the device. Displaying an image of the user's eyes provides an appearance that a person interacting with the user is looking directly at the user's eyes. However, a misalignment between the image of the eyes and the eye detracts from the appearance. For example, if the display is displaying the user's eyes and the user is wearing the device higher on his/her face than expected, the position of the pixels corresponding to the user's eyes may not match where the eyes are expected to be. Hence, the device may need to adjust the display of the image based on a position of the device relative to the body part. In such implementations, the device shifts the image of the user's eyes in order to align the pixels representing the eyes with the eyes of the user. For example, if the user is wearing the device higher on his/her face than expected, the device can shift the image lower in order to align the image of the eyes with the eyes of the user. As another example, if the user is wearing the device lower on his/her face than expected, the device can shift the image higher in order to align the image of the eyes with the eyes of the user. Shifting the image of the eyes based on a position of the device results in the image of the eyes being positioned at an expected position on the display in order to provide an appearance that a person in the physical environment is looking directly at the user's eyes.

Figure 4:
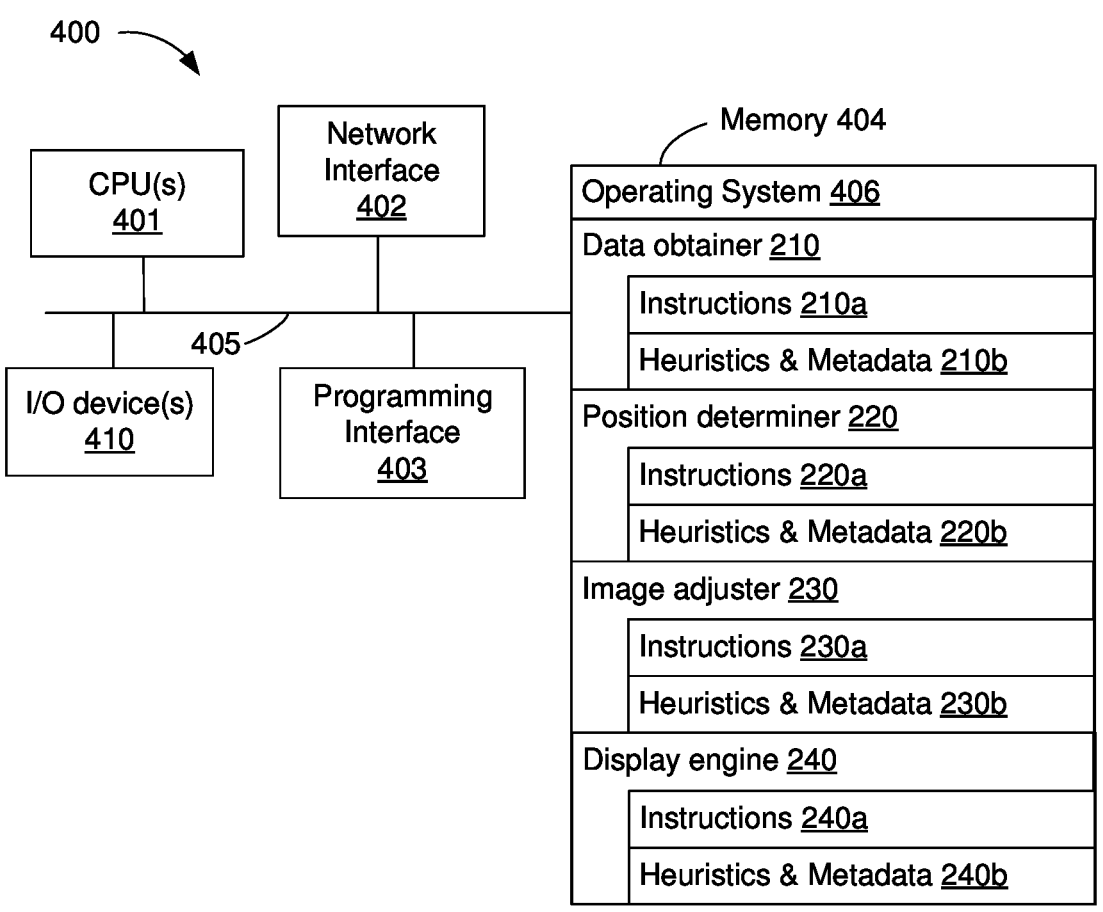
FIG. 4 is a block diagram of a device that adjusts display of an image based on device position in accordance with some implementations.

FIG. 4 is a block diagram of a device 400 in accordance with some implementations. In some implementations, the device 400 implements the electronic device 20 shown in FIGS. 1A-1D and/or the image presentation engine 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the position determiner 220, the image adjuster 230 and the display engine 240. In various implementations, the device 400 performs the method 300 shown in FIG. 3.

In some implementations, the data obtainer 210 includes instructions 210a, and heuristics and metadata 210b for obtaining (e.g., receiving and/or capturing) the captured image 212 shown in FIG. 2. In some implementations, the data obtainer 210 performs at least some of the operation(s) represented by block 320 in FIG. 3.

In some implementations, the position determiner 220 includes instructions 220a, and heuristics and metadata 220b for determining the position 222 of the electronic device 20 relative to the body part 14 depicted in the captured image 212. In some implementations, the position determiner 220 performs at least some of the operation(s) represented by block 330 in FIG. 3.

In some implementations, the image adjuster 230 includes instructions 230a, and heuristics and metadata 230b for determining the adjustment 232 to the image 30 based on the position 222 of the electronic device 20 relative to the body part 14. In some implementations, the image adjuster 230 performs at least some of the operation(s) represented by block 340 in FIG. 3.

In some implementations, the display engine 240 includes instructions 240a, and heuristics and metadata 240b for adjusting the image 30 based on the position 222 of the electronic device 20 relative to the body part 14. In some implementations, the display engine 240 performs at least some of the operation(s) represented by block 340 in FIG. 3.

In some implementations, the one or more I/O devices 410 include an input device for obtaining inputs (e.g., user inputs, images and/or environmental data). In some implementations, the one or more I/O devices 410 include a touchscreen, a depth sensor (e.g., a depth camera) and/or an image sensor (e.g., a camera, for example, a visible light camera or an infrared light camera such as the image sensor 22 shown in FIGS. 1A-1D). In some implementations, the one or more I/O devices 410 include an environmental sensor such as an ambient light sensor. In some implementations, the one or more I/O devices 410 include a display (e.g., the display 26 shown in FIGS. 1A-1D).

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at a device including an image sensor, a display, a non-transitory memory and one or more processors coupled with the image sensor, the display and the non-transitory memory:

obtaining a first image of a body part of a user of the device;

capturing, via the image sensor, a second image of the body part;

determining, based on the second image, a position of the body part relative to the device;

generating an adjusted image by adjusting the first image based on the position of the body part relative to the device; and displaying the adjusted image on the display.

2. The method of claim 1, wherein adjusting the first image comprises aligning pixels in the first image that correspond to the body part with the body part.

3. The method of claim 1, wherein adjusting the first image comprises utilizing a matrix to match a first coordinate space corresponding to the first image with a second coordinate space corresponding to the body part.

4. The method of claim 3, further comprising generating the matrix by identifying a geometry of the body part and encoding the geometry of the body part.

5. The method of claim 1, wherein adjusting the first image comprises rotating the first image.

6. The method of claim 1, wherein adjusting the first image comprises shifting the first image.

7. The method of claim 1, wherein adjusting the first image comprises scaling the first image.

8. The method of claim 1, wherein adjusting the first image comprises:

detecting a misalignment between the body part and the first image of the body part; and adjusting the first image in response to the misalignment being greater than a tolerance threshold.

9. The method of claim 1, wherein adjusting the first image comprises:

determining whether or not the device is being moved relative to the body part;

adjusting the first image in response to determining that the device is not being moved relative to the body part; and forgoing adjustment of the first image in response to determining that the device is being moved relative to the body part.

10. The method of claim 1, wherein adjusting the first image comprises:

determining whether or not a person is within a threshold distance of the device;

adjusting the first image in response to determining that there is a person within the threshold distance of the device; and forgoing adjustment of the first image in response to determining that a person is not within the threshold distance of the device.

11. The method of claim 1, wherein adjusting the first image comprises:

determining a battery level of the device;

adjusting the first image in response to the battery level satisfying a threshold battery level; and forgoing adjustment of the first image in response to the battery level breaching the threshold battery level.

12. The method of claim 1, wherein the body part includes eyes of the user; and wherein determining the position of the body part comprises:

determining respective positions of pupils over a period of time; and averaging the respective positions of the pupils over the period of time.

13. The method of claim 1, wherein the device includes a wearable computing device; and wherein the device occludes the body part when the user wears the device.

14. A device comprising:

one or more processors;

an image sensor;

a display;

a non-transitory memory; and one or more programs stored in the non-transitory memory, which, when executed by the one or more processors, cause the device to:

obtain a first image of a body part of a user of the device;

capture, via the image sensor, a second image of the body part;

determine, based on the second image, a position of the body part relative to the device;

generating an adjusted image by adjusting the first image based on the position of the body part relative to the device; and display the adjusted image on the display.

15. The device of claim 14, wherein adjusting the first image comprises aligning pixels in the first image that correspond to the body part with the body part.

16. The device of claim 14, wherein adjusting the first image comprises utilizing a matrix to match a first coordinate space corresponding to the first image with a second coordinate space corresponding to the body part.

17. The device of claim 16, wherein the one or more programs further cause the device to generate the matrix by identifying a geometry of the body part and encoding the geometry of the body part.

18. The device of claim 14, wherein adjusting the first image comprises rotating the first image.

19. The device of claim 14, wherein adjusting the first image comprises shifting the first image.

20. A non-transitory memory storing one or more programs, which, when executed by one or more processors of a device including a display and an image sensor, cause the device to:

obtain a first image of a body part of a user of the device;

capture, via the image sensor, a second image of the body part;

determine, based on the second image, a position of the body part relative to the device;

generate an adjusted image by adjusting the first image based on the position of the body part relative to the device; and display the adjusted image on the display.

\* \* \* \* \*